United States Patent
Tanaka et al.

(10) Patent No.: US 11,078,385 B2
(45) Date of Patent: Aug. 3, 2021

(54) REMOVABLE RADIATION-CURABLE SILICONE COMPOSITION AND RELEASE SHEET

(71) Applicant: SHIN-ETSU CHEMICAL CO., LTD., Tokyo (JP)

(72) Inventors: Kenji Tanaka, Annaka (JP); Shunji Aoki, Annaka (JP); Munenao Hirokami, Annaka (JP); Tetsuro Yamada, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 16/604,758

(22) PCT Filed: Apr. 3, 2018

(86) PCT No.: PCT/JP2018/014219
§ 371 (c)(1),
(2) Date: Oct. 11, 2019

(87) PCT Pub. No.: WO2018/190188
PCT Pub. Date: Oct. 18, 2018

(65) Prior Publication Data
US 2020/0056075 A1    Feb. 20, 2020

(30) Foreign Application Priority Data

Apr. 13, 2017   (JP) ................................ JP2017-079940

(51) Int. Cl.
| | |
|---|---|
| *C09D 183/04* | (2006.01) |
| *C09J 7/40* | (2018.01) |
| *C09D 183/08* | (2006.01) |
| *C08G 77/20* | (2006.01) |

(52) U.S. Cl.
CPC ............ *C09J 7/401* (2018.01); *C09D 183/08* (2013.01); *C08G 77/20* (2013.01); *C09J 2400/28* (2013.01); *C09J 2433/005* (2013.01); *C09J 2483/005* (2013.01)

(58) Field of Classification Search
None
See application file for complete search history.

(56) References Cited

U.S. PATENT DOCUMENTS

| | | | | |
|---|---|---|---|---|
| 4,070,526 A * | 1/1978 | Colquhoun | ......... | C08F 283/122 428/447 |
| 4,810,731 A * | 3/1989 | Hida | ....................... | C08L 83/04 522/33 |
| 4,935,455 A * | 6/1990 | Huy | ..................... | C03C 25/106 522/83 |
| 5,100,993 A * | 3/1992 | Hida | ..................... | C08K 5/5406 522/172 |
| 5,158,988 A * | 10/1992 | Kurita | ...................... | C08K 5/53 522/64 |
| 5,169,879 A * | 12/1992 | Lee | ....................... | C03C 25/106 522/14 |
| 5,302,627 A * | 4/1994 | Field | ........................ | C08F 2/46 522/13 |
| 5,328,941 A * | 7/1994 | Hayashi | ................ | C08F 299/08 522/33 |
| 5,420,222 A * | 5/1995 | Stepp | ..................... | C08L 83/04 528/31 |
| 7,105,584 B2 * | 9/2006 | Chambers | ................ | C08J 3/243 522/99 |
| 9,353,265 B2 * | 5/2016 | Ono | ........................ | C08L 83/04 |
| 9,732,239 B2 * | 8/2017 | Clapp | .................. | C08F 290/068 |
| 10,604,653 B2 * | 3/2020 | Dogen | .................. | B29C 43/305 |
| 2013/0042973 A1 * | 2/2013 | Sakamoto | ............ | C09K 3/1018 156/275.5 |
| 2013/0065983 A1 * | 3/2013 | Ono | ........................ | C08L 83/08 522/172 |
| 2015/0344740 A1 * | 12/2015 | Griswold | ................. | C09D 7/65 428/352 |

FOREIGN PATENT DOCUMENTS

| | | |
|---|---|---|
| JP | 60-104115 A | 6/1985 |
| JP | 10-237398 A | 9/1998 |
| JP | 3060868 B2 | 7/2000 |
| JP | 3394164 B2 | 4/2003 |
| JP | 2016-41774 A | 3/2016 |
| JP | 2016-150958 A | 8/2016 |

OTHER PUBLICATIONS

Corcione et al., "Factors influencing photo curing kinetics of novel UV-cured siloxane-modified acrylic coatings: Oxygen inhibition and composition", Thermochimica Acta, 2012, vol. 534, pp. 21-27.
International Search Report, issued in PCT/JP2018/014219, PCT/ISA/210, dated Jul. 10, 2018.
Written Opinion of the international Searching Authority, issued in PCT/JP2018/014219, PCT/ISA/237, dated Jul. 10, 2018.
Extended European Search Report for European Application No. 18783911.3, dated Dec. 4, 2020.

* cited by examiner

*Primary Examiner* — Robert S Loewe
(74) *Attorney, Agent, or Firm* — Birch, Stewart, Kolasch & Birch, LLP

(57) ABSTRACT

Provided are: a removable radiation-curable silicone composition which has excellent radiation curability and gives cured objects having excellent adhesiveness to the substrates; and a release sheet. The removable radiation-curable silicone composition comprises the following components (A), (B), (C), and (D): (A) 100 parts by mass of an organopolysiloxane having an alkenyl group; (B) 1-30 parts by mass of an organopolysiloxane having a mercaptoalkyl group; (C) 0.1-5 parts by mass of a compound having a plurality of acryl groups in the molecule; and (D) 0.1-15 parts by mass of a radical polymerization initiator.

3 Claims, No Drawings ved adhesion to substrates, and a release sheet.

REMOVABLE RADIATION-CURABLE SILICONE COMPOSITION AND RELEASE SHEET

TECHNICAL FIELD

This invention relates to a releasable radiation-curable silicone composition which is effectively radiation-curable to form a cured product having improved adhesion to substrates, and a release sheet.

BACKGROUND ART

Release sheets, e.g., release paper and release film which are releasable from sticky or pressure-sensitive adhesive (PSA) materials are manufactured by coating an organopolysiloxane composition onto the surface of various substrates such as paper, laminated paper, synthetic film, transparent resins and metal foil, and inducing crosslinking reaction to form a cured film. There are known various means for curing the organopolysiloxane composition, for example, condensation reaction with the aid of organometallic compounds, vulcanization with the aid of organic peroxides, and hydrosilylation reaction with the aid of platinum group metal catalysts. While these curing methods need heating, low or room temperature cure is required for productivity increases or energy savings. Besides, a radiation curing method is used as the curing method other than heating.

The radiation curing method encompasses cure modes through radical polymerization of acrylic modified polysiloxane, cation polymerization based on ring-opening of epoxy groups on epoxy-modified polysiloxane, and thiolene reaction of mercapto-modified polyorganosiloxane.

When a cured film is formed by radical polymerization of acrylic modified polysiloxane using a photo-radical initiator, the film is tightly adhesive to substrates and effectively curable. However, a device for reducing an oxygen concentration is necessary because cure is inhibited by the presence of oxygen.

When a cured film is formed by cation polymerization based on ring-opening of epoxy groups on epoxy-modified polysiloxane using a photoacid generator, cure in air is possible because cure inhibition by oxygen is avoided. However, cure inhibition can occur where a substrate contains a compound capable of inhibiting acid generation, or under the influence of air-borne humidity.

When a cured film is formed by thiol-ene reaction of mercapto-modified polyorganosiloxane using a photo-radical initiator, cure proceeds via radical polymerization as in the case of acrylic modified polysiloxane. Advantageously, the system is curable in air without the influence of an oxygen concentration, and is less susceptible to the influence of cure inhibitory substances unlike the cation polymerization. By virtue of these advantages, the composition is applicable as a backing treating agent of PSA tape, release agent of PSA label and tape based on a substrate containing various additives. The future expansion of the market is expected. For this reason, many inventions relating to release agents utilizing thiol-ene reaction of mercapto-modified polyorganosiloxane have been proposed.

The radical polymerization by thiol-ene reaction allows cure to proceed without the influence of an oxygen concentration in air unlike the radical polymerization of acrylic groups, but is slower in reaction rate than the radical polymerization of acrylic groups, leading to a tendency to lower the adhesion to substrates.

JP 3060868 (Patent Document 1) proposes a releasable UV-curable silicone composition comprising:

(A) an organopolysiloxane containing at least two silicon-bonded alkenyl groups per molecule and having a viscosity at 25° C. of 100 to 10,000 cp, (B) an organopolysiloxane containing at least two silicon-bonded alkenyl groups per molecule and having a viscosity at 25° C. of at least 1,000,000 cp, (C) an organopolysiloxane containing at least two silicon-bonded mercaptoalkyl groups per molecule, and (D) a photo-initiator as main components, the composition having a viscosity at 25° C. of at least 10,000 cp. The addition of component (B) or high-viscosity organopolysiloxane endows a cured film with sliding and light release relative to various PSA materials. Since the crosslinking density is reduced by the addition of component (B), there is the risk that the adhesion to substrates lowers.

JP 3394164 (Patent Document 2) proposes a releasable UV-curable silicone composition comprising:

(1) 100 parts by weight of an alkenyl-containing organopolysiloxane containing on the average 1 to 3 branched structures per molecule and having a viscosity at 25° C. of 100 to 100,000 cp, (2) 1 to 30 parts by weight of an organopolysiloxane containing at least two silicon-bonded mercaptoalkyl groups per molecule, and (3) a photo-initiator compatible with the organopolysiloxanes as main components. This invention intends to improve curability by using component (1) or branched alkenyl-containing organopolysiloxane. Since the number of branched structures per molecule is as small as 1 to 3 on the average, an improvement in adhesion is unexpectable.

PRIOR ART DOCUMENTS

Patent Documents

Patent Document 1: JP 3060868
Patent Document 2: JP 3394164
Patent Document 3: JP-A 2016-041774

SUMMARY OF INVENTION

Technical Problem

An object of the invention, which has been made under the above-mentioned circumstances, is to provide a releasable radiation-curable silicone composition which is effectively radiation-curable to form a cured product having improved adhesion to substrates, and a release sheet.

Solution to Problem

Making extensive investigations to attain the above object, the inventors have found that the outstanding problem is solved by adding a small amount of a compound having a plurality of acrylic groups per molecule as an adhesion improver to a releasable radiation-curable silicone composition for release sheets comprising an alkenyl-containing organopolysiloxane, a mercapto-containing organopolysiloxane and a photo-initiator, because a release sheet which is significantly improved in adhesion to a substrate while maintaining the release properties unchanged can be manufactured therefrom. It has been confirmed that the releasable radiation-curable silicone composition of the invention forms a cured product capable of maintaining the release properties despite excellent adhesion, as compared with prior art radiation-curable silicone compositions. The invention is predicated on this finding.

Accordingly, the invention provides the following.

[1] A releasable radiation-curable silicone composition comprising the following components (A), (B), (C), and (D):

(A) 100 parts by weight of an alkenyl-containing organopolysiloxane having the average compositional formula (1):

[Chem. 1]

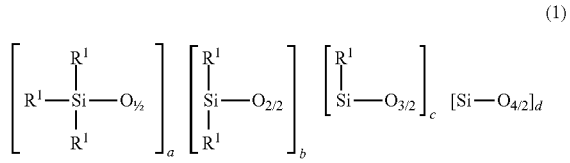

(1)

wherein $R^1$ which may be the same or different is a $C_1$-$C_{10}$ monovalent hydrocarbon group, $a \geq 0$, $b \geq 0$, $c \geq 0$, $d \geq 0$, and $2 \leq a+b+c+d \leq 8,000$, $R^1$, a, b, c, and d are selected such that at least two silicon-bonded alkenyl groups are present per molecule, (B) 1 to 30 parts by weight of a mercaptoalkyl-containing organopolysiloxane having the average compositional formula (2):

[Chem. 2]

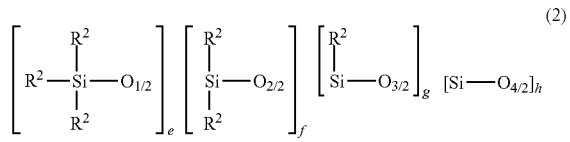

(2)

wherein $R^2$ which may be the same or different is a $C_1$-$C_{10}$ monovalent hydrocarbon group or mercaptoalkyl group, $e \geq 0$, $f \geq 0$, $g \geq 0$, $h \geq 0$, and $2 \leq e+f+g+h \leq 300$, $R^2$, e, f, g, and h are selected such that at least two silicon-bonded mercaptoalkyl groups are present per molecule, (C) 0.1 to 5 parts by weight of a compound having a plurality of acrylic groups per molecule, and (D) 0.1 to 15 parts by weight of a radical polymerization initiator.

[2] The releasable radiation-curable silicone composition of [1] wherein component (C) is a compound having at least three acrylic groups per molecule.

[3] The releasable radiation-curable silicone composition of [2] wherein component (C) is a hydrocarbon compound having at least three acrylic groups per molecule.

[4] The releasable radiation-curable silicone composition of [2] wherein component (C) is a silane compound having at least three acrylic groups per molecule or a hydrolytic condensate thereof.

[5] A release sheet prepared by coating the releasable radiation-curable silicone composition of any one of [1] to [4] onto a substrate and irradiating radiation to the coating for curing the coating.

Advantageous Effects of Invention

According to the invention, there are provided a releasable radiation-curable silicone composition which is effectively radiation-curable to form a cured product having improved adhesion to substrates, and a release sheet.

DESCRIPTION OF EMBODIMENTS

Now the invention is described in detail. The invention provides a releasable radiation-curable silicone composition comprising components (A), (B), (C), and (D).

[Component (A)]

Component (A) is an alkenyl-containing organopolysiloxane having the average compositional formula (1).

[Chem. 3]

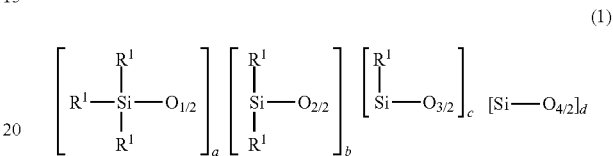

(1)

Herein $R^1$ which may be the same or different is a $C_1$-$C_{10}$ monovalent hydrocarbon group, $a \geq 0$, $b \geq 0$, $c \geq 0$, $d \geq 0$, and $2 \leq a+b+c+d \leq 8,000$, $R^1$, a, b, c, and d are selected such that at least two silicon-bonded alkenyl groups are present per molecule. The organopolysiloxane may be used alone or in a combination of two or more.

In formula (1), $R^1$ which may be the same or different is a $C_1$-$C_{10}$ monovalent hydrocarbon group, and is selected such that at least two silicon-bonded $C_1$-$C_{10}$ alkenyl groups are present per molecule. The $C_1$-$C_{10}$ monovalent hydrocarbon groups are substituted or unsubstituted $C_1$-$C_{10}$ monovalent hydrocarbon groups which include alkyl groups such as methyl, ethyl, propyl and butyl, cycloalkyl groups such as cyclohexyl, alkenyl groups such as vinyl, allyl, butenyl, hexenyl, and octenyl, aryl groups such as phenyl and tolyl, and substituted forms of the foregoing in which some or all of the carbon-bonded hydrogen atoms are substituted by halogen atoms such as fluorine and chlorine, for example, 3,3,3-trifluoropropyl, perfluorobutylethyl, perfluorooctylethyl, or by (meth)acrylic functional groups such as acryloxy and methacryloxy, for example, 3-methacryloxypropyl and 3-acryloxypropyl, or by polyoxyalkylene groups such as polyoxyethylene or polyoxypropylene, or by alkoxy groups, for example, methoxypropyl and ethoxypropyl. While component (A) contains at least two silicon-bonded alkenyl groups per molecule, the alkenyl groups are preferably vinyl, allyl or hexenyl.

Preferably in view of release properties, groups other than the alkenyl group include phenyl groups in an amount of 1 to 10 mol % of overall groups $R^1$ in the molecule, and the remaining groups are methyl groups. A phenyl content of less than 1 mol % leads to less UV cure whereas a phenyl content in excess of 10 mol % leads to tight release and is unsuitable for release sheets.

$R^1$, a, b, c, and d are selected such that at least two, preferably at least three silicon-bonded alkenyl groups are present per molecule and may also be selected such that the alkenyl and phenyl contents fall in the above ranges. The preferred range is $a \geq 2$, $b \geq 50$, $c \geq 0$, $d \geq 0$, more preferably $a \geq 2$, $b \geq 100$, $c \geq 0$, $d = 0$. The sum is $2 \leq a+b+c+d \leq 8,000$, preferably $2 \leq a+b+c+d \leq 5,000$.

[Component (B)]

Component (B) is a mercaptoalkyl-containing organopolysiloxane having the average compositional formula (2).

[Chem. 4]

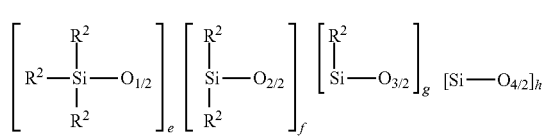

(2)

Herein $R^2$ which may be the same or different is a $C_1$-$C_{10}$ monovalent hydrocarbon group or mercaptoalkyl group, $e \geq 0$, $f \geq 0$, $g \geq 0$, $h \geq 0$, and $2 \leq e+f+g+h \leq 300$, $R^2$, e, f, g, and h are selected such that at least two silicon-bonded mercaptoalkyl groups are present per molecule. The organopolysiloxane may be used alone or in a combination of two or more.

$R^2$ which may be the same or different is a $C_1$-$C_{10}$, preferably $C_1$-$C_3$ monovalent hydrocarbon group or mercaptoalkyl group. Examples of the $C_1$-$C_{10}$ monovalent hydrocarbon groups other than the mercaptoalkyl group include alkyl groups such as methyl, ethyl and propyl, aryl groups such as phenyl and tolyl, and substituted forms of the foregoing in which some or all of the carbon-bonded hydrogen atoms are substituted by halogen atoms such as fluorine and chlorine, for example, 3,3,3-trifluoropropyl, perfluorobutylethyl, perfluorooctylethyl, or by alkoxy groups, for example, methoxypropyl and ethoxypropyl. While component (B) contains at least two silicon-bonded mercaptoalkyl groups per molecule, it is preferred in view of release properties and compatibility with component (A) that the silicon-bonded group other than mercaptoalkyl be methyl which accounts for at least 50 mol % of overall groups $R^2$ in the molecule.

Exemplary mercaptoalkyl groups include mercaptomethyl, mercaptoethyl, mercaptopropyl, and mercaptohexyl, with mercaptopropyl being preferred for availability of reactants and ease of synthesis. It is preferred in view of crosslinking efficiency that the content of mercaptoalkyl groups based on the overall groups $R^2$ in the molecule (i.e., the content of silicon-bonded mercaptoalkyl based on the overall silicon-bonded organic groups) be 10 to 50 mol %.

$R^2$, e, f, g, and h are selected such that at least two silicon-bonded mercaptoalkyl groups are present per molecule. The subscripts e, f, g, and h are preferably, in case of e=0, f≥3, g≥0, and h=0, or in case of e≠0, e≥1, f≥0, g≥1, and h≥0; more preferably in case of e=0, f≥4, g≥0, and h=0, or in case of e≠0, e≥2, f≥0, g≥2, and h=0. The sum is $2 \leq e+f+g+h \leq 300$, preferably $2 \leq e+f+g+h \leq 200$.

An amount of component (B) blended is 1 to 30 parts by weight, preferably 2 to 25 parts by weight, more preferably 3 to 20 parts by weight per 100 parts by weight of component (A). Less than 1 part by weight of component (B) leads to a lowering of cure whereas an amount in excess of 30 parts by weight achieves no improvement in cure and reduces release properties.

[Component (C)]

Component (C) is a compound having a plurality of acrylic groups per molecule. It is a component for enhancing the adhesion of the releasable radiation-curable silicone composition. The compound may be used alone or in a combination of two or more as component (C). Examples of component (C) include hydrocarbon compounds having acrylic groups and silane compounds having acrylic groups or hydrolytic condensates thereof. For the compound having a plurality of acrylic groups per molecule, the number of acrylic groups per molecule is at least 2, preferably at least 3. Particularly when a compound having at least 3 acrylic groups per molecule is added, a significant improvement in adhesion is achievable.

Suitable hydrocarbon compounds having a plurality of acrylic groups per molecule include acrylic compounds having a functionality of 2, 3, 4 or more.

Difunctional acrylic compounds include 1,4-butanediol diacrylate, 1,6-hexanediol diacrylate, 1,9-nonanediol diacrylate, 1,10-decanediol diacrylate, tricyclodecane dimethanol diacrylate, dipropylene glycol diacrylate, and tripropylene glycol diacrylate. Such a compound is commercially available as Viscoat #700HV (ethoxylated (3.8) bisphenol A diacrylate) from Osaka Organic Chemical Industry Ltd.

Trifunctional acrylic compounds include trimethylolpropane triacrylate and pentaerythritol triacrylate. Such compounds are commercially available as A-9300 (tris(2-acryloxyethyl) isocyanurate) from Shin-Nakamura Chemical Co., Ltd., and as TMPEOTA (trimethylolpropane ethoxy triacrylate) and OTA 480 (glycerine propoxy triacrylate), both from Daicel-Allnex Ltd.

Tetra- or polyfunctional acrylic compounds include pentaerythritol tetraacrylate, ditrimethylolpropane tetraacrylate, dipentaerythritol hexaacrylate, and A-9550 (dipentaerythritol polyacrylate) by Shin-Nakamura Chemical Co., Ltd.

Suitable silane compounds having at least 2 acrylic groups per molecule include those having the general formula (3).

[Chem. 5]

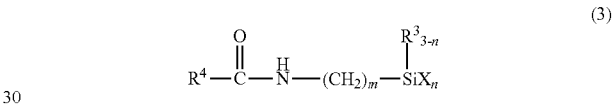

(3)

Herein n is an integer of 1 to 3, m is an integer of 1 to 10, X is a $C_1$-$C_4$ alkoxy group, $R^3$ is a $C_1$-$C_4$ alkyl group, and $R^4$ is a structural group having the formula (4) or (4').

[Chem. 6]

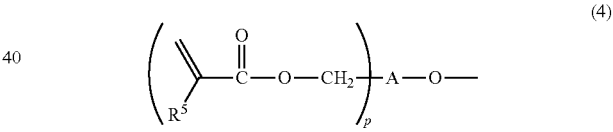

(4)

Herein A is an organic linking group in the form of a $C_1$-$C_{10}$ straight, branched or cyclic divalent hydrocarbon group which may be separated by an oxygen or nitrogen atom, but does not contain another heteroatom, $R^5$ is hydrogen, and p is an integer of 1 to 5.

[Chem. 7]

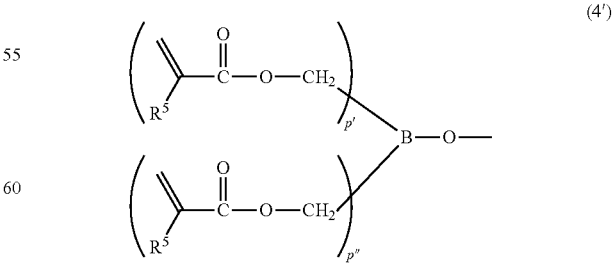

(4')

Herein B is an organic linking group in the form of a $C_1$-$C_{10}$ straight, branched or cyclic trivalent hydrocarbon group which may be separated by an oxygen or nitrogen atom, but does not contain another heteroatom, $R^5$ is hydrogen, and p' and p" each are an integer of at least 1, and p'+p" is an integer of 2 to 5.

Of the compounds having formula (3), silane compounds containing at least 2 acrylic groups per molecule, represented by the general formulae (5) to (8) are preferred. Herein X and n are as defined above.

[Chem. 8]

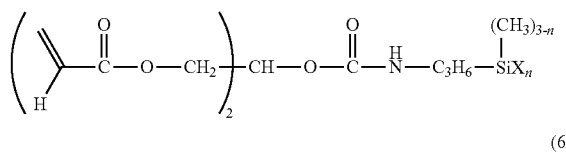

(5)

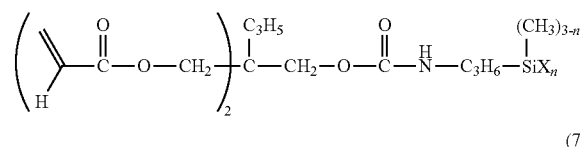

(6)

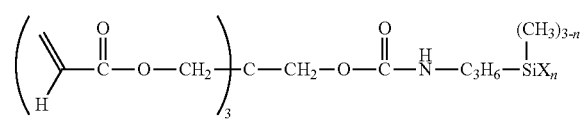

(7)

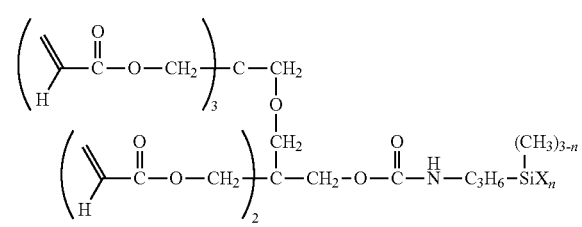

(8)

The silane compound having at least 2 acrylic groups per molecule, as represented by formulae (3), (5) to (8), may be obtained by reacting a compound having acrylic and hydroxyl groups in a common molecule, as described in JP-A 2016-041774, with an organosilicon compound having an isocyanate group.

Examples of the organosilicon compound having an isocyanate group include 3-isocyanatopropyltrimethoxysilane, 3-isocyanatopropylmethyldimethoxysilane, 3-isocyanatopropyltriethoxysilane, and 3-isocyanatopropylmethyldiethoxysilane. Of these, 3-isocyanatopropyltrimethoxysilane and 3-isocyanatopropyltriethoxysilane are preferred for availability of reactants.

Examples of the compound having acrylic and hydroxyl groups in a common molecule include difunctional acrylic alcohols such as 2-hydroxy-3-acryloyloxypropyl methacrylate, and polyfunctional acrylic alcohols such as pentaerythritol triacrylate and dipentaerythritol pentaacrylate.

In preparing the silane compound having a plurality of acrylic groups per molecule, a catalyst may be used if necessary. It may be any of catalysts commonly used in isocyanate reaction, preferably a tin compound. The catalyst is used in an amount of 0.0000001 to 1 mole, more preferably 0.000001 to 0.01 mole per mole of the organosilicon compound having an isocyanate group. A catalyst amount in excess of 1 mole is uneconomical because the effect is saturated. If the catalyst amount is less than 0.0000001 mole, the catalytic effect may be short, resulting in a low reaction rate and low productivity.

In preparing the silane compound having a plurality of acrylic groups per molecule, the reaction is exothermic, with the risk that side reactions can occur at extremely high temperature. For this reason, the reaction temperature is preferably 20 to 150° C., more preferably 30 to 130° C., even more preferably 40 to 110° C. A temperature below 20° C. leads to a low reaction rate and low productivity. If the temperature exceeds 150° C., there is the risk that side reactions, for example, polymerization reaction of the organosilicon compound having an isocyanate group and polymerization of acrylic groups can occur.

A hydrolytic condensate of the silane compound having a plurality of acrylic groups per molecule may also be used as the adhesion-improving component. For hydrolytic condensation, prior art well-known methods are applicable.

Suitable hydrolytic condensation catalysts include acids such as hydrochloric acid, nitric acid, acetic acid, and maleic acid, alkali metal hydroxides such as NaOH and KOH, amine compounds such as ammonia, triethylamine, dibutylamine, hexylamine and octylamine, salts of amine compounds, bases including quaternary ammonium salts such as benzyltriethylammonium chloride, tetramethylammonium hydroxide, tetrabutylammonium hydroxide, fluoride salts such as potassium fluoride and sodium fluoride; solid acidic catalysts or solid basic catalysts (e.g., ion exchange resin catalysts); organometallic compounds, for example, metal salts of organic carboxylic acids such as iron-2-ethylhexoate, titanium naphthate, zinc stearate and dibutyltin diacetate, organotitanium esters such as tetrabutoxytitanium and dibutoxy-(bis-2,4-pentanedionate)titanium, organozirconium esters such as tetrabutoxyzirconium and zirconium dibutoxide(bis-2,4-pentanedionate), alkoxyaluminum compounds such as aluminum triisopropoxide, aluminum chelate compounds such as aluminum acetylacetonate complex; aminoalkyl-substituted alkoxysilanes such as 3-aminopropyltrimethoxysilane and N-(β-aminoethyl)-3-aminopropyltrimethoxysilane, which may be used alone or in admixture.

The desired condensate is obtained by subjecting the silane compound having a plurality of acrylic groups per molecule to hydrolytic condensation in the presence of the hydrolytic condensation catalyst, water and optionally, an organic solvent.

An amount of component (C) blended is 0.1 to 5 parts by weight, preferably 0.2 to 4 parts by weight, more preferably 0.3 to 3 parts by weight per 100 parts by weight of component (A). Less than 0.1 part by weight of component (C) is ineffective for adhesion improvement whereas an amount in excess of 5 parts by weight achieves no improvement in adhesion and reduces release properties.

[Component (D)]

Component (D) is a radical polymerization initiator capable of generating a radical upon irradiation of radiation.

The radical polymerization initiator is not particularly limited as long as it is capable of generating a radical upon irradiation of radiation. Examples include diethoxyacetophenone, 2-hydroxy-2-methyl-1-phenylpropan-1-one, 4'-isopropyl-2-hydroxy-2-methylpropiophenone, 2-hydroxymethyl-2-methylpropiophenone, 2,2-dimethoxy-1,2-diphenylethan-1-one, p-dimethylaminoacetophenone, p-tert-butyldichloroacetophenone, p-tert-butyltrichloroacetophenone, p-azidobenzaracetophenone, 1-hydroxycyclohexyl phenyl ketone, 2-methyl-1-[4-(methylthio)phenyl]-2-morpholinopropanone-1, 2-benzyl-2-dimethylamino-1-(4- morpholinophenyl)-butanone-1, benzoin, benzoin methyl ether, benzoin ethyl ether, benzoin isopropyl ether, benzoin n-butyl ether, benzoin isobutyl ether, benzyl, anisyl, benzophenone, methyl o-benzoylbenzoate, 4,4'-bis(dimethylamino)benzophenone, 4,4'-bis(diethylamino)benzophenone, 4,4'-dichlorobenzophenone, 4-benzoyl-4'-methyldiphenyl sulfide, thioxanthone, 2-methylthioxanthone, 2-ethylthioxanthone, 2-chlorothioxanthone, 2-isopropylthioxanthone, 2,4-diethylthioxanthone, bis(cyclopentadienyl)-bis(2,6-difluoro-3-(hydropyrrol-1-yl)titanium, and 1-(4-(2-hydroxyethoxy)phenyl)-2-hydroxy-2-methyl-1-propan-1-one.

These radical polymerization initiators may be used alone or in admixture, depending on the desired performance.

An amount of component (D) blended is 0.1 to 15 parts by weight, preferably 0.5 to 13 parts by weight, more preferably 1 to 10 parts by weight per 100 parts by weight of component (A). Less than 0.1 part by weight of component (D) leads to a lowering of cure whereas an amount in excess of 15 parts by weight achieves no improvement in cure and reduces release properties.

The releasable radiation-curable silicone composition is obtained by metering predetermined amounts of the foregoing components and mixing them. Besides, additives such as a silicone resin, polydimethylsiloxane, filler, antistatic agent, flame retardant, defoamer, flow control agent, photo-stabilizer, solvent, non-reactive resin, and radical polymerizable compound may be used as optional components. The amounts of optional components added may be conventional amounts as long as the benefits of the invention are not compromised.

The term "releasable" in the releasable radiation-curable silicone composition means that a cured product of the silicone composition is releasable. The term "releasable" preferably corresponds to a release force of 0.005 to 10.0 N/25 mm, more preferably 0.01 to 8.0 N/25 mm as measured under the conditions of "Release force test 1 of releasable radiation-curable silicone composition" in Example 1 below.

[Release Sheet]

The releasable radiation-curable silicone composition prepared above is coated on various substrates and cured with radiation, yielding release sheets, for example. The composition is coated on a substrate and cured with radiation. The substrate is not particularly limited and any of various substrates commonly used in the art may be used. Examples include glassine paper, clay-coated paper, wood-free paper, polyethylene-laminated paper, plastic films such as polyester film, polystyrene film, polyethylene film, and polypropylene film, transparent resins such as polycarbonate, and metal foils such as aluminum foil. The coating weight of the silicone composition is typically about 0.05 to about 3.0 g/m² though not particularly limited.

For the radiation cure, energy rays in the ultraviolet to visible region (~100 to ~800 nm) emitted from high or ultra-high pressure mercury lamps, metal halide lamps, xenon lamps, carbon arc lamps, fluorescent lamps, semiconductor solid laser, argon laser, He—Cd laser, KrF excimer laser, ArF excimer laser, and $F_2$ laser, are preferably used as the radiation energy source. A radiation source having a high luminous intensity in the region of 200 to 400 nm is preferred. Further, high-energy radiation such as electron beam or X-ray may also be used. The irradiation time of radiation energy is typically about 0.1 to about 10 seconds at normal temperature. Where the energy ray is less penetrative or a coating of the curable composition is thick, it is sometimes preferred to take a longer time. If necessary, after irradiation of energy ray, the coating may be post-cured by heating at room temperature to 150° C. for several seconds to several hours.

The releasable radiation-curable silicone composition is curable by radiation irradiation even in air, and still curable even when the oxygen concentration is reduced for more efficient cure. Since the cure becomes more efficient as the oxygen concentration is reduced, a lower oxygen concentration is preferred. Specifically the oxygen concentration is 1 or less % by volume, preferably 0.1 or less % by volume, more preferably 0.01 or less % by volume. As the case may be, the inventive composition may be diluted with an organic solvent prior to use.

EXAMPLES

Synthesis Examples, Examples, and Comparative Examples are given below for illustrating the invention, but the invention is not limited thereto. In Examples, physical properties are measured by the following methods. The viscosity is a measurement at 25° C. by a BN type rotational viscometer.

The releasable radiation-curable silicone composition of the invention was evaluated by the following methods.

[Release Force Test 1 on Releasable Radiation-Curable Silicone Composition]

After a releasable radiation-curable silicone composition was prepared, it was roll coated on a polyethylene-laminated paper sheet of 38 μm thick so as to give a coating weight of ~1.7 g/m², and irradiated with UV from two high-pressure mercury lamps of 80 W/cm in a dose of 100 mJ/cm², to form a cured film. The cured film was held at 25° C. for 20 hours, after which an acrylic pressure-sensitive adhesive tape (trade name TESA 7475) of 25 mm wide was rested on the surface of the cured film and press-bonded thereto by moving a roller of 2 kg back and forth, obtaining a sample for release force measurement. With a load of 70 g/cm² applied, the sample was aged at 70° C. for 20 to 24 hours. Using a tensile tester, the tape was peeled at an angle of 180° and a peel rate of 0.3 m/min, the force (N/25 mm) required for peeling was measured. The results are shown in Table 1.

[Residual Adhesion Test 1 on Releasable Radiation-Curable Silicone Composition]

After a releasable radiation-curable silicone composition was prepared, it was roll coated on a polyethylene-laminated paper sheet of 38 μm thick so as to give a coating weight of ~1.7 g/m², and irradiated with UV from two high-pressure mercury lamps of 80 W/cm in a dose of 100 mJ/cm², to form a cured film. The cured film was held at 25° C. for 20 hours, after which an acrylic PSA tape (trade name TESA 7475) of 25 mm wide was rested on the surface of the cured film and press-bonded thereto by moving a roller of 2 kg back and forth, obtaining a sample for release force measurement. With a load of 70 g/cm² applied, the sample was aged at 70° C. for 20 to 24 hours. Using a tensile tester, the tape was peeled at an angle of 180° and a peel rate of 0.3 m/min. The tape was rested on a stainless steel plate and press-bonded thereto by moving a roller of 2 kg back and forth. After holding at 25° C. for 30 minutes, a force (Y) required to peel the tape was measured. Similarly, a force (Z) required to peel a tape TESA 7475, which had not been bonded to the cured film, from a stainless steel plate was measured. A percent residual adhesion was computed by dividing Y by Z. The results are shown in Table 1.

[Bond Test 1]

After a releasable radiation-curable silicone composition was prepared, it was roll coated on a polyethylene-laminated paper sheet of 38 μm thick so as to give a coating weight of ~1.7 g/m², and irradiated with UV from two high-pressure mercury lamps of 80 W/cm in a dose of 100 mJ/cm², to form a cured film. The cured film was rubbed with the finger 10 strokes, after which it was visually observed for smear and rub-off and evaluated according to the following criterion. The results are shown in Table 1.

A: no smear or rub-off observed
B: some smear and rub-off observed
C: smear or rub-off observed
D: uncured

[Release Force Test 2 on Releasable Radiation-Curable Silicone Composition]

After a releasable radiation-curable silicone composition was prepared, it was roll coated on a polyethylene-laminated paper sheet of 38 μm thick so as to give a coating weight of ~1.7 g/m², and irradiated with UV from two high-pressure mercury lamps of 80 W/cm in a dose of 100 mJ/cm² in a nitrogen atmosphere having an oxygen concentration of 150 ppm, to form a cured film. The cured film was held at 25° C. for 20 hours, after which an acrylic PSA tape (trade name TESA 7475) of 25 mm wide was rested on the surface of the cured film and press-bonded thereto by moving a roller of 2 kg back and forth, obtaining a sample for release force measurement. With a load of 20 g/cm² applied, the sample was aged at 70° C. for 20 to 24 hours. Using a tensile tester, the tape was peeled at an angle of 180° and a peel rate of 0.3 m/min, the force (N/25 mm) required for peeling was measured. The results are shown in Table 2.

[Residual Adhesion Test 2 on Releasable Radiation-Curable Silicone Composition]

After a releasable radiation-curable silicone composition was prepared, it was roll coated on a polyethylene-laminated paper sheet of 38 μm thick so as to give a coating weight of ~1.7 g/m², and irradiated with UV from two high-pressure mercury lamps of 80 W/cm in a dose of 100 mJ/cm² in a nitrogen atmosphere having an oxygen concentration of 150 ppm, to form a cured film. The cured film was held at 25° C. for 20 hours, after which an acrylic PSA tape (trade name TESA 7475) of 25 mm wide was rested on the surface of the cured film and press-bonded thereto by moving a roller of 2 kg back and forth, obtaining a sample for release force measurement. With a load of 20 g/cm² applied, the sample was aged at 70° C. for 20 to 24 hours. Using a tensile tester, the tape was peeled at an angle of 180° and a peel rate of 0.3 m/min. The tape was rested on a stainless steel plate and press-bonded thereto by moving a roller of 2 kg back and forth. After holding at 25° C. for 30 minutes, a force (Y) required to peel the tape was measured. Similarly, a force (Z) required to peel a tape TESA 7475, which had not been bonded to the cured film, from a stainless steel plate was measured. A percent residual adhesion was computed by dividing Y by Z. The results are shown in Table 2.

[Bond Test 2]

After a releasable radiation-curable silicone composition was prepared, it was roll coated on a polyethylene-laminated paper sheet of 38 μm thick so as to give a coating weight of ~1.7 g/m², and irradiated with UV from two high-pressure mercury lamps of 80 W/cm in a dose of 100 mJ/cm² in a nitrogen atmosphere having an oxygen concentration of 150 ppm, to form a cured film. The cured film was rubbed with the finger 10 strokes, after which it was visually observed for smear and rub-off and evaluated according to the following criterion. The results are shown in Table 2.

A: no smear or rub-off observed
B: some smear and rub-off observed
C: smear or rub-off observed
D: uncured Example 1

A silicone composition #1 was prepared by intimately mixing (A-1) 100 parts by weight of a vinyl-containing polydimethylsiloxane represented by the following average compositional formula and having a viscosity of 3,500 mPa·s at 25° C.,

[Chem. 9]

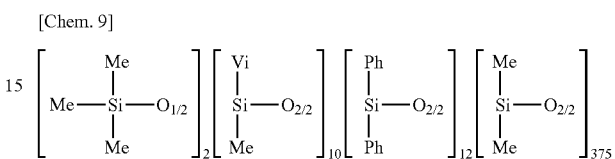

wherein Me stands for methyl, Ph for phenyl, and Vi for vinyl, (B-1) 10 parts by weight of a mercapto-containing polydimethylsiloxane represented by the following average compositional formula and having a viscosity of 40 mPa·s at 25° C.,

[Chem. 10]

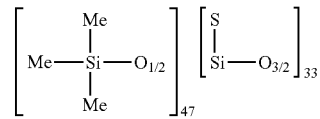

wherein Me stands for methyl and S for mercaptopropyl, (C-1) 1.0 part by weight of 1,6-hexanediol diacrylate, and
(D) 3 parts by weight of 2-hydroxy-2-methyl-1-phenyl-propan-1-one as radical polymerization initiator.

Example 2

A silicone composition #2 was obtained by the same procedure as in Example 1 aside from using (A-2) 100 parts by weight of a vinyl-containing polydimethylsiloxane represented by the following average compositional formula and having a viscosity of 800 mPa·s at 25° C. as component (A),

[Chem. 11]

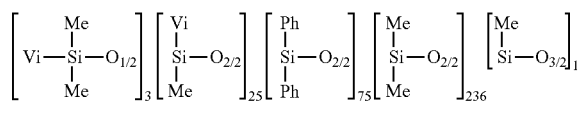

wherein Me stands for methyl, Ph for phenyl, and Vi for vinyl.

Example 3

A silicone composition #3 was obtained by the same procedure as in Example 1 aside from using (B-2) 10 parts by weight of a mercapto-containing polydimethylsiloxane represented by the following average compositional formula and having a viscosity of 50 mPa·s at 25° C. as component (B),

[Chem. 12]

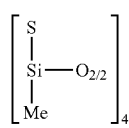

wherein Me stands for methyl and S for mercaptopropyl.

Example 4

A silicone composition #4 was obtained by the same procedure as in Example 1 aside from using (C-2) 1.0 part by weight of trimethylolpropane triacrylate as component (C).

Example 5

A silicone composition #5 was obtained by the same procedure as in Example 4 aside from using (A-2) 100 parts by weight of the vinyl-containing polydimethylsiloxane as component (A).

Example 6

A silicone composition #6 was obtained by the same procedure as in Example 4 aside from using (B-2) 100 parts by weight of the mercapto-containing polydimethylsiloxane as component (B).

Example 7

A silicone composition #7 was obtained by the same procedure as in Example 1 aside from using (C-3) 1.0 part by weight of dipentaerythritol hexaacrylate as component (C).

Example 8

A silicone composition #8 was obtained by the same procedure as in Example 7 aside from using (A-2) 100 parts by weight of the vinyl-containing polydimethylsiloxane as component (A).

Example 9

A silicone composition #9 was obtained by the same procedure as in Example 1 aside from using (C-4) 1 part by weight of a silane compound having the general formula as component (C):

[Chem. 13]

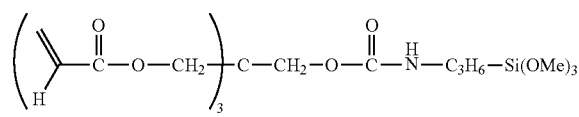

wherein Me stands for methyl, as component (C).

Example 10

A silicone composition #10 was obtained by the same procedure as in Example 9 aside from using (A-2) 100 parts by weight of the vinyl-containing polydimethylsiloxane as component (A).

Example 11

A silicone composition #11 was obtained by the same procedure as in Example 1 aside from using (C-5) 1 part by weight of a silane compound having the general formula as component (C):

[Chem. 14]

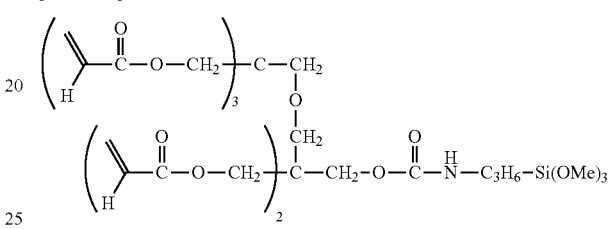

wherein Me stands for methyl, as component (C).

Example 12

A silicone composition #12 was obtained by the same procedure as in Example 11 aside from using (A-2) 100 parts by weight of the vinyl-containing polydimethylsiloxane as component (A).

Example 13

A silicone composition #13 was obtained by the same procedure as in Example 8 aside from using (C-3) 3.0 parts by weight of dipentaerythritol hexaacrylate as component (C).

Comparative Example 1

A silicone composition #14 was obtained by the same procedure as in Example 1 aside from omitting (C-1) from Example 1.

Comparative Example 2

A silicone composition #15 was obtained by the same procedure as in Example 2 aside from omitting (C-1) from Example 2.

Comparative Example 3

A silicone composition #16 was obtained by the same procedure as in Example 3 aside from omitting (C-1) from Example 3.

Comparative Example 4

A silicone composition #17 was obtained by the same procedure as in Example 1 aside from using 1 part by weight of 4-hydroxybutyl acrylate (X) instead of (C-1) in Example 1.

Comparative Example 5

A silicone composition #18 was obtained by the same procedure as in Example 2 aside from using 1 part by weight of 4-hydroxybutyl acrylate (X) instead of (C-1) in Example 2.

Comparative Example 6

A silicone composition #19 was obtained by the same procedure as in Comparative Example 4 aside from using 3 parts by weight of 4-hydroxybutyl acrylate (X) in Comparative Example 4.

Comparative Example 7

A silicone composition #20 was obtained by the same procedure as in Comparative Example 5 aside from using 3 parts by weight of 4-hydroxybutyl acrylate (X) in Comparative Example 5. Comparative Example 7 was evaluated by release force test 1, residual adhesion test 1, and bond test 1.

TABLE 1

Release force test 1, residual adhesion test 1, bond test 1

| | | (A-1) | (A-2) | (B-1) | (B-2) | (C-1) | (C-2) | (C-3) | (C-4) | (C-5) | (X) | Release force (N/25 mm) | Residual adhesion (%) | Bond |
|---|---|---|---|---|---|---|---|---|---|---|---|---|---|---|
| Example | 1 | 100 | | 10 | | 1 | | | | | | 0.45 | 86 | B |
| | 2 | | 100 | 10 | | 1 | | | | | | 0.44 | 84 | B |
| | 3 | 100 | | | 10 | 1 | | | | | | 0.47 | 85 | B |
| | 4 | 100 | | 10 | | | 1 | | | | | 0.43 | 83 | A |
| | 5 | | 100 | 10 | | | 1 | | | | | 0.46 | 85 | A |
| | 6 | 100 | | | 10 | | 1 | | | | | 0.48 | 86 | A |
| | 7 | 100 | | 10 | | | | 1 | | | | 0.44 | 83 | A |
| | 8 | | 100 | 10 | | | | 1 | | | | 0.44 | 84 | A |
| | 9 | 100 | | 10 | | | | | 1 | | | 0.45 | 83 | A |
| | 10 | | 100 | 10 | | | | | 1 | | | 0.47 | 85 | A |
| | 11 | 100 | | 10 | | | | | | 1 | | 0.43 | 84 | A |
| | 12 | | 100 | 10 | | | | | | 1 | | 0.46 | 85 | A |
| | 13 | | 100 | 10 | | | | 3 | | | | 0.48 | 86 | A |
| Comparative Example | 1 | 100 | | 10 | | | | | | | | 0.44 | 85 | C |
| | 2 | | 100 | 10 | | | | | | | | 0.41 | 83 | C |
| | 3 | 100 | | | 10 | | | | | | | 0.47 | 84 | C |
| | 4 | 100 | | 10 | | | | | | | 1 | 0.47 | 84 | C |
| | 5 | | 100 | 10 | | | | | | | 1 | 0.48 | 83 | C |
| | 6 | 100 | | 10 | | | | | | | 3 | | | D |
| | 7 | | 100 | 10 | | | | | | | 3 | | | D |

\* A sample rated D in bond was not measured for release force and residual adhesion.

TABLE 2

Release force test 2, residual adhesion test 2, bond test 2

| | | (A-1) | (A-2) | (B-1) | (B-2) | (C-1) | (C-2) | (C-3) | (C-4) | (C-5) | (X) | Release force (N/25 mm) | Residual adhesion (%) | Bond |
|---|---|---|---|---|---|---|---|---|---|---|---|---|---|---|
| Example | 1 | 100 | | 10 | | 1 | | | | | | 0.22 | 95 | B |
| | 2 | | 100 | 10 | | 1 | | | | | | 0.23 | 96 | B |
| | 3 | 100 | | | 10 | 1 | | | | | | 0.24 | 98 | A |
| | 4 | 100 | | 10 | | | 1 | | | | | 0.24 | 97 | A |
| | 5 | | 100 | 10 | | | 1 | | | | | 0.25 | 96 | A |
| | 6 | 100 | | | 10 | | 1 | | | | | 0.24 | 95 | A |
| | 7 | 100 | | 10 | | | | 1 | | | | 0.21 | 94 | A |
| | 8 | | 100 | 10 | | | | 1 | | | | 0.23 | 96 | A |
| | 9 | 100 | | 10 | | | | | 1 | | | 0.25 | 97 | A |
| | 10 | | 100 | 10 | | | | | 1 | | | 0.24 | 96 | A |
| | 11 | 100 | | 10 | | | | | | 1 | | 0.22 | 95 | A |
| | 12 | | 100 | 10 | | | | | | 1 | | 0.23 | 94 | A |
| | 13 | | 100 | 10 | | | | 3 | | | | 0.24 | 94 | A |
| Comparative Example | 1 | 100 | | 10 | | | | | | | | 0.23 | 95 | C |
| | 2 | | 100 | 10 | | | | | | | | 0.26 | 93 | C |
| | 3 | 100 | | | 10 | | | | | | | 0.24 | 94 | C |
| | 3 | 100 | | 10 | | | | | | | 1 | 0.22 | 93 | C |
| | 4 | | 100 | 10 | | | | | | | 1 | 0.26 | 96 | C |
| | 5 | 100 | | 10 | | | | | | | 3 | 0.27 | 95 | C |
| | 6 | | 100 | 10 | | | | | | | 3 | 0.31 | 94 | C |

The invention claimed is:

1. A releasable radiation-curable silicone composition comprising the following components (A), (B), (C), and (D):

(A) 100 parts by weight of an alkenyl-containing organopolysiloxane having the average compositional formula (1):

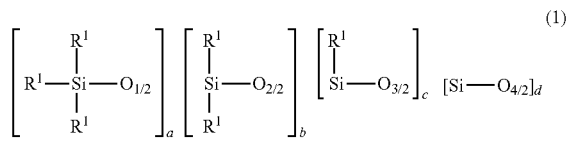

(1)

wherein $R^1$ which may be the same or different is a $C_1$-$C_{10}$ monovalent hydrocarbon group, $a \geq 0$, $b \geq 0$, $c \geq 0$, $d \geq 0$, and $2 \leq a+b+c+d \leq 8,000$, a, b, c, and d are selected such that at least two silicon-bonded alkenyl groups are present per molecule, (B) 1 to 30 parts by weight of a mercaptoalkyl-containing organopolysiloxane having the average compositional formula (2):

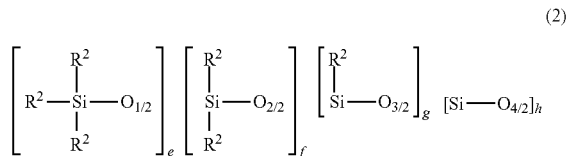

(2)

wherein $R^2$ which may be the same or different is a $C_1$-$C_{10}$ monovalent hydrocarbon group or mercaptoalkyl group, $e \geq 0$, $f \geq 0$, $g \geq 0$, $h \geq 0$, and $2 \leq e+f+g+h \leq 300$, $R^2$, e, f, g, and h are selected such that at least two silicon-bonded mercaptoalkyl groups are present per molecule, (C) 0.1 to 5 parts by weight of a compound having a plurality of acrylic groups per molecule, and (D) 0.1 to 15 parts by weight of a radical polymerization initiator, wherein component (C) is a silane compound having at least three acrylic groups per molecule or a hydrolytic condensate thereof.

2. A release sheet prepared by coating the releasable radiation-curable silicone composition of claim 1 onto a substrate and irradiating radiation to the coating for curing the coating.

3. A releasable radiation-curable silicone composition comprising the following components (A), (B), (C), and (D):

(A) 100 parts by weight of an alkenyl-containing organopolysiloxane having the average compositional formula (1):

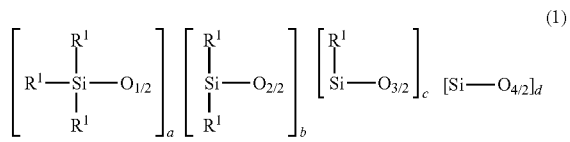

(1)

wherein $R^1$ which may be the same or different is a $C_1$-$C_{10}$ monovalent hydrocarbon group, $a \geq 0$, $b \geq 0$, $c \geq 0$, $d \geq 0$, and $2 \leq a+b+c+d \leq 8,000$, $R^1$, a, b, c, and d are selected such that at least two silicon-bonded alkenyl groups are present per molecule, (B) 1 to 30 parts by weight of a mercaptoalkyl-containing organopolysiloxane having the average compositional formula (2):

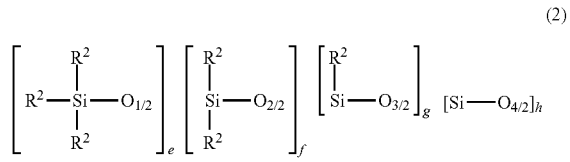

(2)

wherein $R^2$ which may be the same or different is a $C_1$-$C_{10}$ monovalent hydrocarbon group or mercaptoalkyl group, $e \geq 0$, $f \geq 0$, $g \geq 0$, $h \geq 0$, and $2 \leq e+f+g+h \leq 300$, $R^2$, e, f, g, and h are selected such that at least two silicon-bonded mercaptoalkyl groups are present per molecule, (C) 0.1 to 5 parts by weight of a silane compound having a plurality of acrylic groups per molecule, and (D) 0.1 to 15 parts by weight of a radical polymerization initiator.

* * * * *